United States Patent [19]

Wada

[11] Patent Number: 5,714,952
[45] Date of Patent: Feb. 3, 1998

[54] DIGITAL SIGNAL DECODING APPARATUS

[75] Inventor: Toru Wada, Saitama, Japan

[73] Assignee: Sony Corporation, Tokyo, Japan

[21] Appl. No.: 589,460

[22] Filed: Jan. 22, 1996

[30] Foreign Application Priority Data

Jan. 25, 1995 [JP] Japan ................. 7-030032

[51] Int. Cl.$^6$ ................................................ H03M 13/00
[52] U.S. Cl. ........................ 341/94; 371/30; 371/31; 371/48
[58] Field of Search ............................. 341/94; 371/30, 371/31, 48

[56] References Cited

U.S. PATENT DOCUMENTS

| | | | |
|---|---|---|---|
| 5,222,069 | 6/1993 | Chevalley | 371/40.3 |
| 5,351,131 | 9/1994 | Nishino et al. | 358/335 |
| 5,416,600 | 5/1995 | Matsumi et al. | 358/335 |
| 5,416,804 | 5/1995 | Khaled et al. | 375/341 |
| 5,543,928 | 8/1996 | Takakura | 358/335 |
| 5,576,765 | 11/1996 | Cheney et al. | 348/407 |

*Primary Examiner*—Fritz Fleming
*Assistant Examiner*—Jason L. W. Kost
*Attorney, Agent, or Firm*—William S. Frommer; Alvin Sinderbrand

[57] ABSTRACT

A digital signal decoding apparatus for preventing errors which cannot be corrected sufficiently by error correction from reflecting on a decoded signal. An uncorrectable error part of a digital signal or a data part including the error part is replaced with a special code including a synchronous code, and is output to decoding means. Because the decoding means capable of identifying the synchronous code can also identify the special code, a proper error processing can be executed by confirming the presence of errors at the time of decoding. Therefore, by using the decoding means, it is possible to prevent errors which cannot be sufficiently corrected from reflecting on a decoded signal.

15 Claims, 11 Drawing Sheets

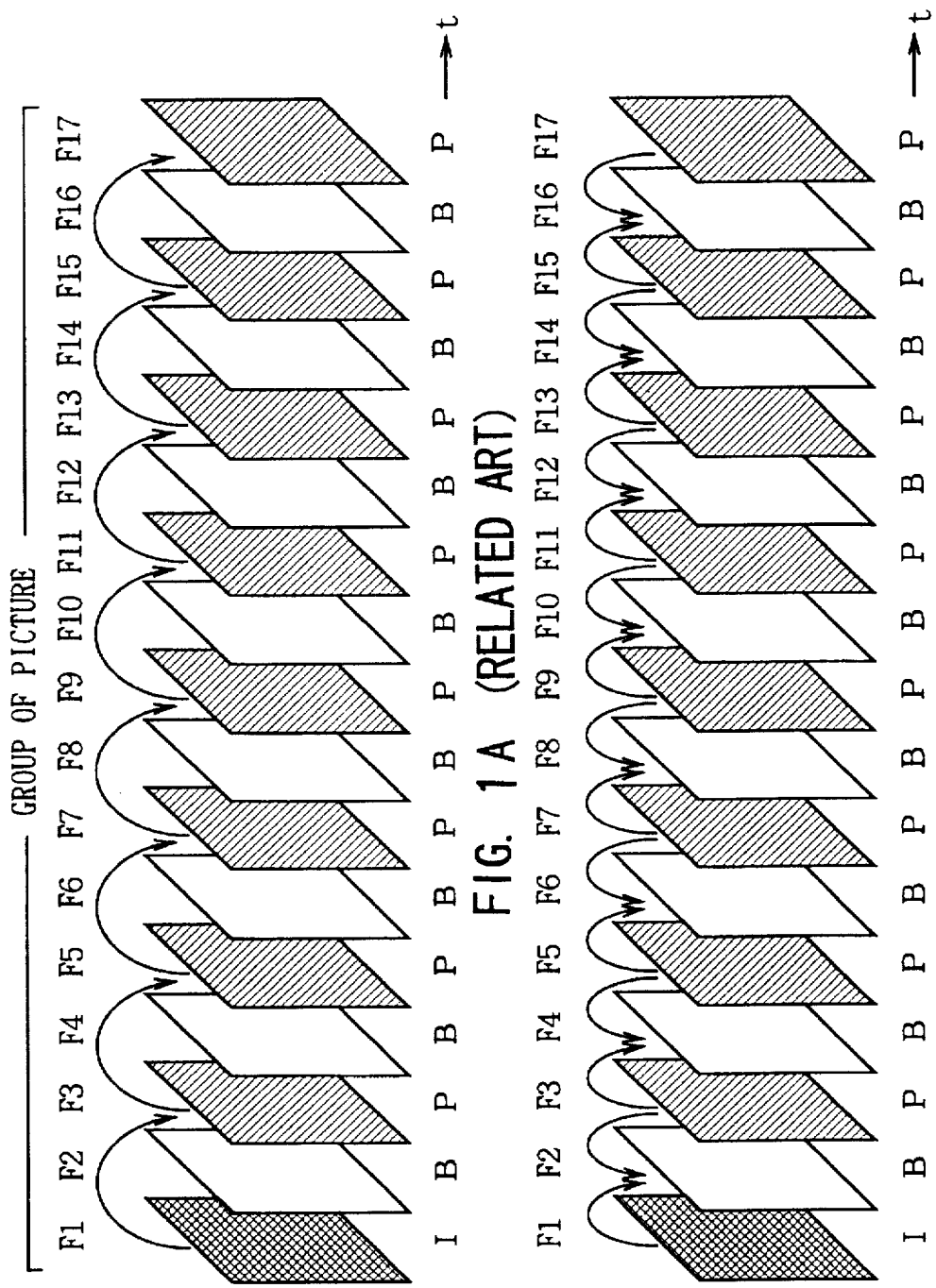

D: IS NECESSARY TO USE PREDICTED PICTURE OBTAINED BY USING PREDICTION MODE, MOVEMENT VECTOR, AND PREDICTION FLAG OF MACROBLOCK IN WHICH PRECEDING PREDICTION IS PERFORMED?

E: IT IS NECESSARY TO USE PREDICTED PICTURE OBTAINED BY USING PREDICTION MODE, MOVEMENT VECTOR, AND PREDICTION FLAG OF PROCESSED MACROBLOCK?

A: IS IT NECESSARY TO USE PREDICTED PICTURE AT SPATIALLY SAME POSITION AS FORWARD PICTURE?
B: IS IT NECESSARY TO USE PREDICTED PICTURE AT SPATIALLY SAME POSITION AS PICTURE ONE FRAME BEFORE IN DISPLAY TIME?
C: IS IT I PICTURE, P PICTURE, OR B PICTURE WHOSE IMMEDIATE FRONT IS NOT B PICTURE?

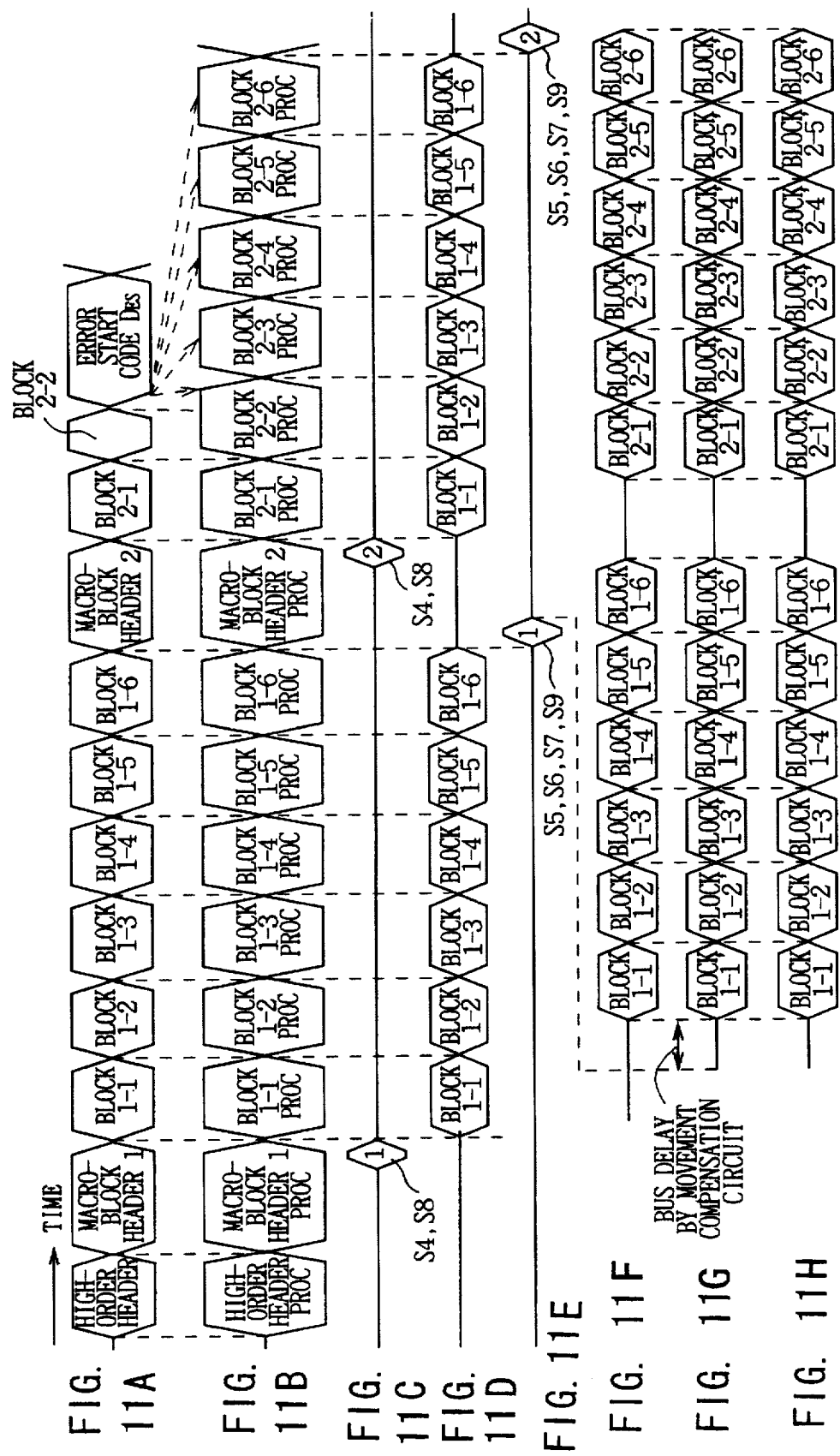

DIGITAL SIGNAL DECODING APPARATUS

BACKGROUND OF THE INVENTION

1. Field of the Invention

The present invention relates to a digital signal decoding apparatus preferably used for a recording/reproducing apparatus for recording or reproducing a moving picture signal in or from a recording medium such as a magneto-optical disc or magnetic tape, and a receiver of a television conference system for transmitting or receiving a moving picture signal through a transmission path.

2. Description of the Related Art

Conventionally, a system for transmitting a moving picture signal to a remote place such as a television conference system, visual telephone system, or broadcast system has used a method of compressing and encoding a video signal by using the line correlation or inter-frame correlation between the video signals in order to efficiently use a transmission line. For example, by using the line correlation, it is possible to compress a video signal by the orthogonal transformation (e.g., DCT (Discrete Cosine Transformation)) encoding processing. Moreover, by using the inter-frame correlation, it is possible to further compress the video signal.

In general, there is not a very large change between pictures of temporally adjacent frames. That is, when calculating the difference between them, the difference signal is small. Therefore, the difference signal is encoded and the encoded value is compressed. However, transmitting only the difference signal cannot restore the original picture. Therefore, a method is used which compresses and encodes a video signal by converting the picture of each frame to any one of three frame formats of I-picture, P-picture, and B-picture.

FIGS. 1A and 1B show the above encoding method. In the case of this compressing and encoding method, a series of frame groups are processed every 17 frames (frames F1 to F17). This processing unit is referred to as a group of pictures. The group of pictures are encoded to I-picture, B-picture, and P-picture in order starting with the first frame F1 and the fourth and subsequent frames F4 to F17 are alternately encoded to B-picture or P-picture.

In this case, I-picture is the picture obtained by directly encoding the video signals for one frame. Moreover, as shown in FIG. 1A, P-picture is basically the picture obtained by encoding the difference between the video signals to I-picture temporally preceding the P-picture or the difference between the video signals to temporally preceding P-picture. Furthermore, as shown in FIG. 1B, B-picture is basically the picture obtained by encoding the difference between the video signals to the average value between a temporally preceding frame and a temporally following frame. This encoding method is referred to as the bidirectional prediction encoding.

In this connection, B-picture uses the following three types of encoding methods in addition to the bidirectional prediction encoding. The first processing method directly transmits the data for the original frame F2 as transmission data. This is referred to as inter-encoding which is the same processing as the case of I-picture. The second processing method calculates and transmits a difference from the temporally-following frame F3. This is referred to as backward prediction encoding. The third processing method transmits a difference from the temporally preceding frame F1. This is referred to as forward prediction encoding.

At the time of encoding, the data encoded by the method for minimizing transmission data among these four encoding methods is used as B-picture.

An actual encoding apparatus further converts the video signals of the frame format (I-picture, P-picture, or B-picture) to block format signals and transmits them in the form of bit streams.

FIGS. 2A to 2C show the block format. As shown in FIG. 2A, V lines of the line composed of H dots for one line are assembled into a frame format video signal.

The video signal of one frame is divided into N slices each of which comprises 16 lines. Each slice is composed of M macroblocks. Each macroblock is composed of a luminance signal corresponding to 16×16 picture elements (dots) and the luminance signal is divided into blocks Y[1] to Y[4] each of which comprises 8×8 dots. The luminance signal of 16×16 dots corresponds to color signals Cb and Cr of 8×8 dots.

The decoding apparatus thus receives and decodes the video signal converted to a bit stream through a recording medium or a transmission line. If an error is included in the bit stream read out from a recording medium or the like, this error part may be reflected on a reproduced picture or the like. Therefore, as shown in FIG. 3, an error detection and correction code addition circuit 1A and an error detection and correction circuit 2A are conventionally provided to an encoding apparatus 1 and a decoding apparatus 2 respectively so that a slight error can be corrected.

The more the length of the error correction code to be added is increased, the more the error correction capacity can be increased by a value equivalent to the increased length. However, because the quantity of transmission data increases as the code length increases, an error correction code with a proper length is normally used. Therefore, when a large data error occurs in a bit stream S2, the error cannot be corrected by the error detection and correction circuit 2A in some cases. In this case, there is a problem that it cannot be avoided that an error included in the bit stream S2 is reflected on the reproduced picture.

Though these are the problems caused at the time of normal reproduction, there are also the following problems at the time of special reproduction such as fast-forward reproduction or quick-reverse reproduction of a picture in addition to the above problems. That is, at the time of special reproduction, the transfer unit (access unit of the disc, etc.) may terminate in the middle of a macroblock. In this case, the method is used in which an error start code $D_{ES}$ including a synchronous code is inserted into the bit stream S2 so that a decoding circuit can identify the end point in the macroblock. However, the following problem may occur in the macroblock including the error start code $D_{ES}$.

In general, an inverse quantizer constituting a decoding circuit and an IDCT (inverse discrete cosine transformation) circuit operate in block units and a movement compensation circuit operates in macroblocks. Moreover, the description is hereafter made by assuming that the bit stream S2 including an uncompleted macroblock is input to a variable-length decoding circuit located at the input stage of the decoding circuit.

As shown in FIG. 4A, in the case of a macroblock "1", macroblock data is completed in blocks between "1-1" and "1-6". In the case of a macroblock "2", however, a block "2-2" is uncompleted and interrupted by the error start code $D_{ES}$.

In this case, for the macroblock "1" in which a bit stream is present to the end, the variable-length decoding circuit supplies a frame/field DCT flag, quantization scale, a prediction mode, movement vector, and frame/field prediction flag to the circuits in rear stage after completing the processing of the header of the macroblock "1" as shown in FIG. 4C. Then, as shown in FIG. 4D, the variable-length decoding circuit supplies picture data to the inverse quantization circuit whenever the processing of each block ends.

On the other hand, when the bit stream is delimited as shown in the macroblock "2", the variable-length decoding circuit detects the delimitation of the bit stream by the error start code $D_{ES}$ including a synchronous code. However, because the macroblock "2" is uncompleted, it is impossible to complete the processing of the block "2-2". Moreover, it is impossible to complete the processing of the macroblock "2".

However, because the inverse quantization circuit and IDCT circuit operate in blocks, their operations are damaged unless the processing of the block "2-2" is completed. Moreover, because the movement compensation circuit operates in each macroblock, the operation of the circuit may be damaged unless the processing of the macroblock "2" is completed.

In this case, the method is considered in which a memory circuit for storing the processing results of the variable-length decoding circuit for one macroblock are provided, and then the data is supplied to a circuit in rear stage when the processing for one macroblock completely ends. By using this method, it is possible to prevent the rear-stage circuit from being broken down by supplying no data to the rear-stage circuit even if an uncompleted macroblock is present.

However, because this method requires a memory circuit for one block after the variable-length decoding circuit, it cannot be avoided that a circuit scale increases or the number of processing circuits increases.

SUMMARY OF THE INVENTION

In view of the foregoing, an object of the present invention is to provide a digital signal decoding apparatus capable of preventing errors included in a bit stream from reflecting on a decoding screen.

Another object of the present invention is to provide a digital signal decoding apparatus capable of continuing decoding without adding any circuits even for an uncompleted macroblock.

The foregoing objects and other objects of the invention have been achieved by the provision of the digital signal decoding apparatus, comprising: error detecting and correcting means for inputting a digital signal through a transmission path, for correcting and outputting an error part included in the digital signal, and for indicating the position of an uncorrectable error part by a flag signal; data replacing means for replacing a digital signal part with the same data length as a special code including a synchronous code in the uncorrectable error part indicated by the flag signal or in the data part including the uncorrectable error part with the special code, and for outputting the special code when the uncorrectable error part is included in the digital signal output from the error detecting and correcting means; and decoding means for inputting a digital signal output from the data replacing means, and for decoding the digital signal by using the special code.

Moreover, in the digital signal decoding apparatus of the present invention for inputting the digital signal through a transmission path to generate an output signal by using a decoded signal of the digital signal and a predicted digital signal, decoding means for outputting the predicted digital signal instead of the decoded signal of an uncompleted data group with a predetermined length constituting the digital signal when the data group is delimited by the predetermined code and uncompleted.

An uncorrectable error part or data part including the error part in the digital signal is replaced with the special code including a synchronous code and output to the decoding means. The special code thus replaced includes a synchronous code, and can always be detected by the decoding means. Therefore, it is possible to realize confirmation of presence of an error and error correction at the time of decoding.

Moreover, when the predetermined-length data group constituting the digital signal is uncompleted because of its delimitation by the predetermined code, the decoding means outputs the predicted digital signal instead of the decoded signal of the uncompleted data group. Thereby, it is possible to obtain the output signal not influenced by the data in uncompleted data group without adding a special circuit for processing the uncompleted data group.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1A and 1B are schematic diagrams explaining types of pictures used to compress picture data;

FIGS. 11A to 11H are timing charts showing types of processing by a variable-length decoding circuit.

DETAILED DESCRIPTION OF THE EMBODIMENT

Preferred embodiments of the present invention will be described with reference to the accompanying drawings:

(1) First Embodiment (1-1) Overall Constitution

Figures 2A, 2B, 2C:
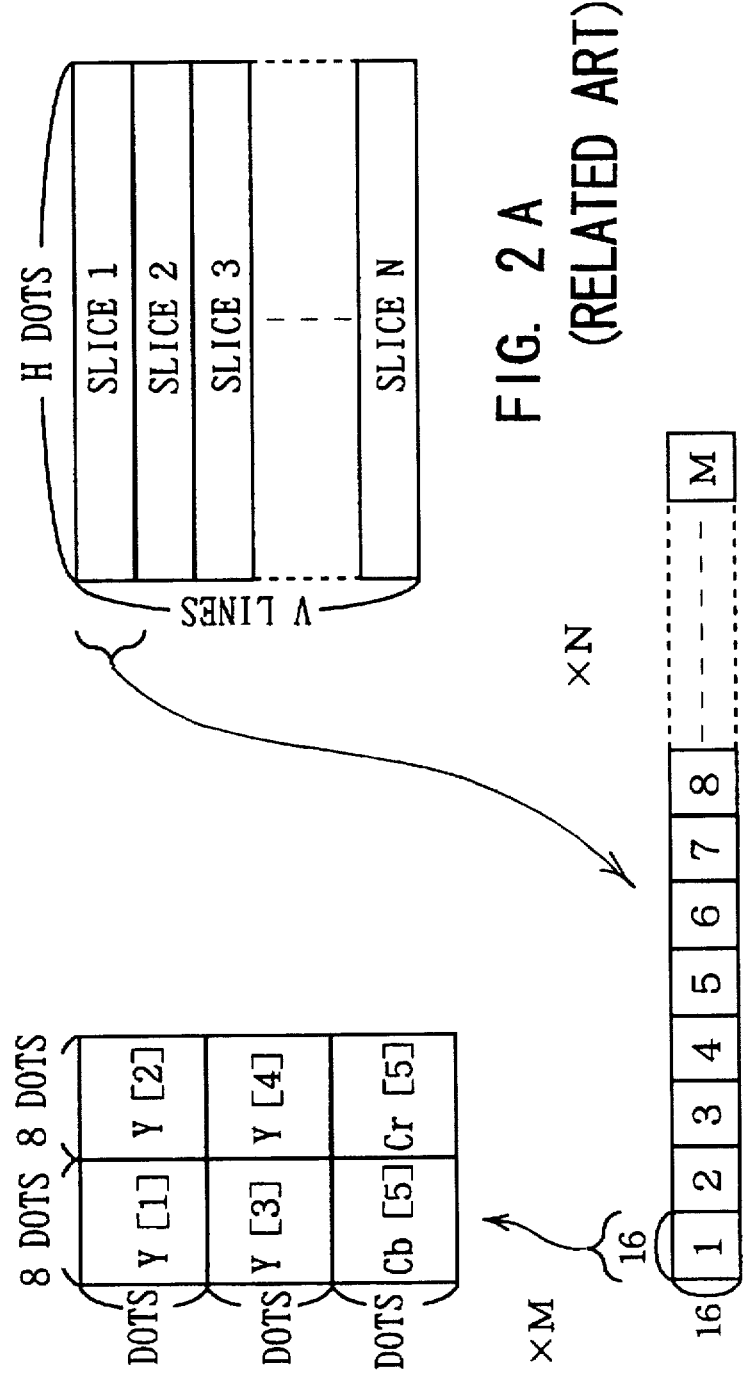
FIGS. 2A to 2C are schematic diagrams explaining data structures of picture data.
Figure 3:
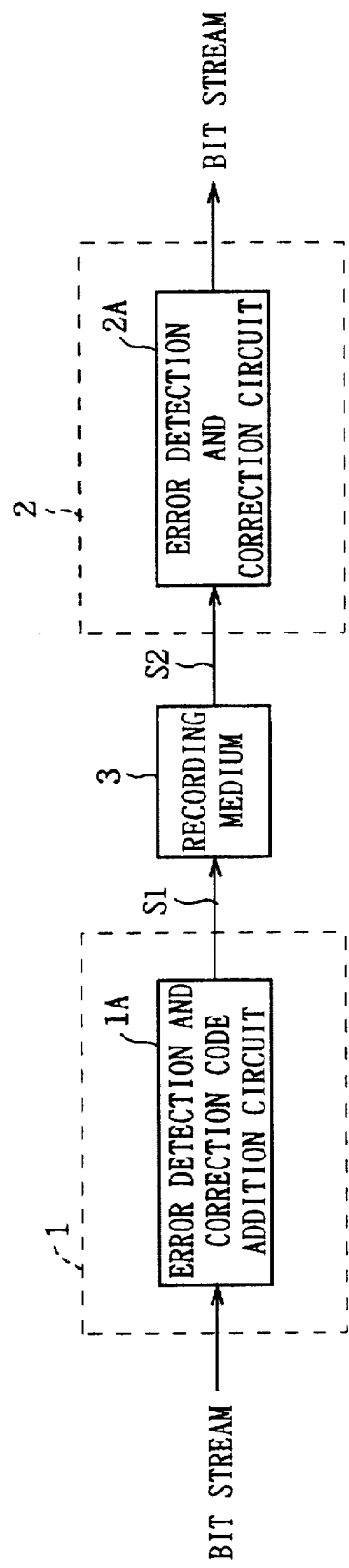
FIG. 3 is a block diagram showing an example of the constitution of conventional video signal encoding apparatus and decoding apparatus.
Figure 4:
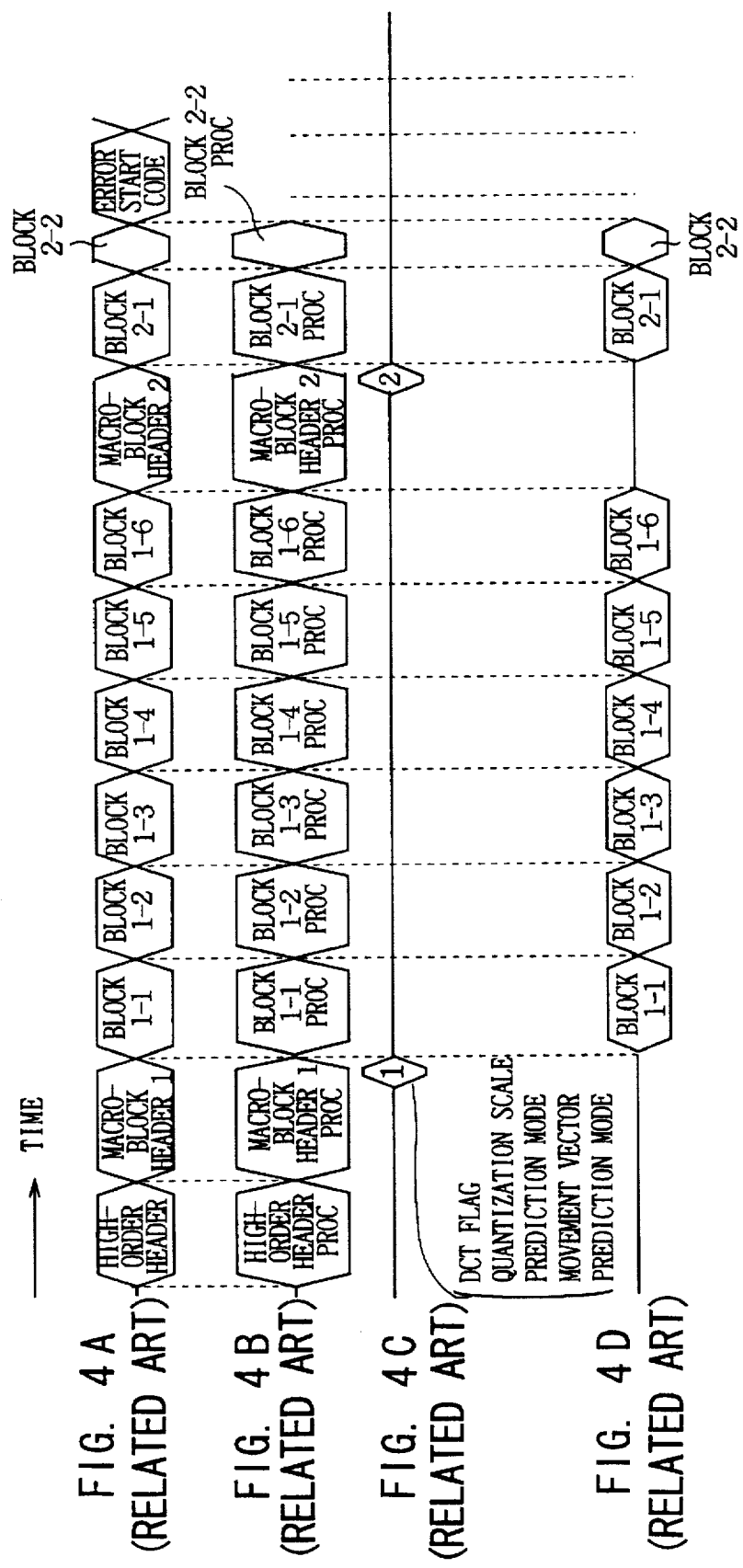
FIGS. 4A to 4D are timing charts showing types of processing by a conventional variable-length decoding circuit.
Figure 5:
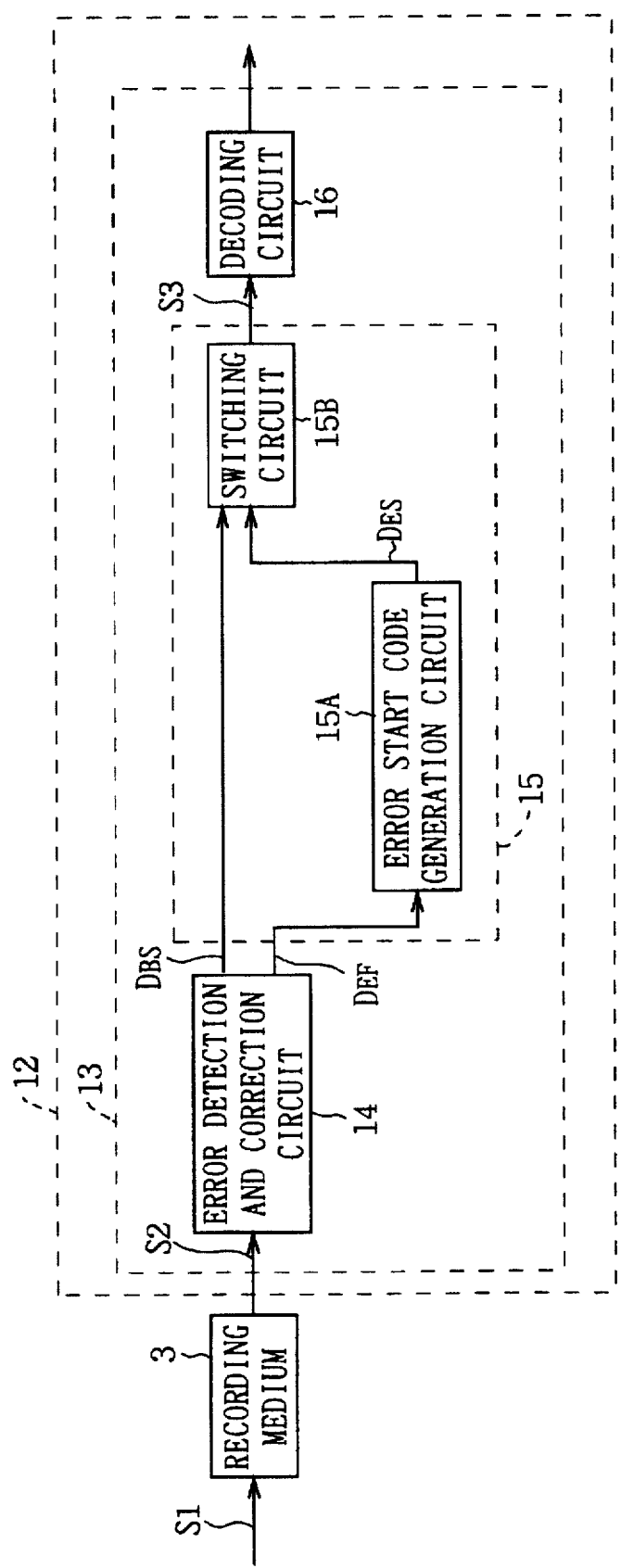
FIG. 5 is a block diagram showing an embodiment of the digital signal decoding apparatus according to the present invention.

FIG. 5 shows the circuit constitution of a decoding apparatus 12. The decoding apparatus 12 have a decoding circuit section 13 for preventing an error from reflecting on an output picture by replacing an error part which cannot be corrected sufficiently by an error detection and correction circuit with the error start code $D_{ES}$ including a synchronous code.

The decoding circuit section 13 is constructed with an error detection and correction circuit 14, an uncorrectable flag conversion circuit 15, and a decoding circuit 16. Each of these circuits is constituted as described below.

The error detection and correction circuit 14 detects presence or absence of an error included in a recording medium 3 or a bit stream S2 input through a transmission path, and corrects the error by using an error correction code when an error is detected. The error detection and correction circuit 14 used in this embodiment outputs an uncorrectable flag $D_{EF}$ together with a bit stream $D_{BS}$ and informs a rear-stage circuit of an uncorrectable error part.

The uncorrectable flag conversion circuit 15 inputs the bit stream $D_{BS}$ and the uncorrectable flag $D_{EF}$, and replaces an error part which cannot be corrected sufficiently by the error detection and correction circuit 14 with the error start code $D_{ES}$. Specifically, an error start code generation circuit 15A receives the uncorrectable flag $D_{EF}$ to detect an error part which cannot be corrected sufficiently by the detection and correction circuit 14, generates the error start code $D_{ES}$ when detecting the error part, and outputs the code $D_{ES}$ to a switching circuit 15B. In accordance with the error start code $D_{ES}$, the switching circuit 15B replaces an error part included in the bit stream S2 or a data part including the error part and having the same data length as the error start code $D_{ES}$ with the error start code $D_{ES}$. Incidentally, if the error part which cannot be corrected sufficiently by the error detection and correction circuit 14 exceeds the error start code in length, a plurality of error start codes ($k \times D_{ES}$) are written directly on the error part.

In the case of this embodiment, the error start code $D_{ES}$ is composed of a 32-bit code shown by "00000000 00000000 00000000 00000001 10110100". Above code is defined by the video signal encoding method generally used at present, in which the initial 24 bits out of 32 bits serve as a synchronous code. Moreover, the final 8 bits serve as an attribute code indicating what the synchronous code represents. In this case, the bits "10110100" serve as an attribute code indicating an error.

In this connection, this code must not appear for any combination of codes in a variable-length encoded bit stream, and can be found under any state of decoding in the decoding circuit 16.

Thus, the uncorrectable flag conversion circuit 15 replaces the error part in the bit stream and the part including the error part and corresponding to the length of the error start code $D_{ES}$ with the error start code $D_{ES}$. This is because: If the error start code $D_{ES}$ is simply inserted into the error part, the data quantity of the bit stream after the insertion of error start code $D_{ES}$ increases compared to that of the bit stream generated by an encoding apparatus by a value equivalent to the error start code $D_{ES}$. In general, because the decoding apparatus is a system for controlling generation of bit streams while checking the capacity of a receiving buffer, the possibility that the receiving buffer is broken down cannot be avoided when the data quantity increases as described above.

Moreover, if a flag is added to the error part, a buffer for storing the flag is needed in order to add the flag to a bit stream so as to sufficiently cover the error part. Therefore, the problem arises that the capacity of the buffer increases.

However, when replacing the bit stream $D_{BS}$ with the error start code $D_{ES}$ as shown in this embodiment, bit streams equal to the number of bit streams generated by the encoding apparatus are stored in the receiving buffer and it is possible to prevent the receiving buffer from being broken down.

Moreover, this embodiment replaces the uncorrectable flag $D_{EF}$ with the error start code $D_{ES}$ just before the receiving buffer (17 in FIG. 6) in order to prevent the capacity of the receiving buffer from increasing by storing the bit stream $D_{BS}$ and moreover the uncorrectable flag.

The decoding circuit 16 is described below. The decoding circuit 16 inputs the bit stream S3 output from the uncorrectable flag conversion circuit 15 through a receiving buffer to execute various decoding processings: variable-length decoding processing; inverse quantization processing; inverse discrete cosine transformation processing; and movement compensation processing, etc..

When discriminating the error start code $D_{ES}$ from the bit stream S3, the decoding circuit 16 operates so that a picture including errors is not output from an output terminal in accordance with a series of decoding processings.

(1-2) Brief Description of Decoding Processings

For the above constitution, a series of decoding processings by the decoding apparatus 12 is described below. First, the decoding apparatus 12 corrects code errors existing in the bit stream S2 by the error detection and correction circuit 14 provided at the first stage. In this case, when there is an error part which cannot be corrected sufficiently by the error correction code, the error correction circuit 14 replaces predetermined-length data including the error part with the error start code $D_{ES}$ to supply the code to the decoding circuit 16. In this case, the decoding circuit section 13 decodes the bit stream S3 in order in accordance with a predetermined decoding procedure. However, when the error start code $D_{ES}$ is included, the decoding circuit section 13 confirms the position of the code part and selects various processing so that no error reflects on a decoded picture.

According to the above constitution, the data part including the uncorrectable data error is replaced with the error start code $D_{ES}$ so that the code can be discriminated by the decoding circuit section 13, so that it is possible to select the processing for preventing data errors which cannot be corrected sufficiently by the error detection and correction circuit 14 from reflecting on the decoded picture. Thereby, it is possible to realize the picture data decoding apparatus by which a picture with higher quality than conventional one can be obtained.

(2) Detailed Description of the Decoding Circuit (2-1) Overall Constitution

A circuital example of the decoding circuit 16 described in the preceding section is described here. The decoding circuit 16 makes it possible to continue decoding without damaging the processing by substituting a predicted picture for the part of an uncompleted macroblock even if the macroblock appears at the time of special reproduction (e.g. at the time of fast-forward reproduction or quick-reverse reproduction). Moreover, in this case, because the predicted picture is substituted for the uncompleted macroblock, the uncompleted macroblock is prevented from reflecting on other pictures.

Figure 6:
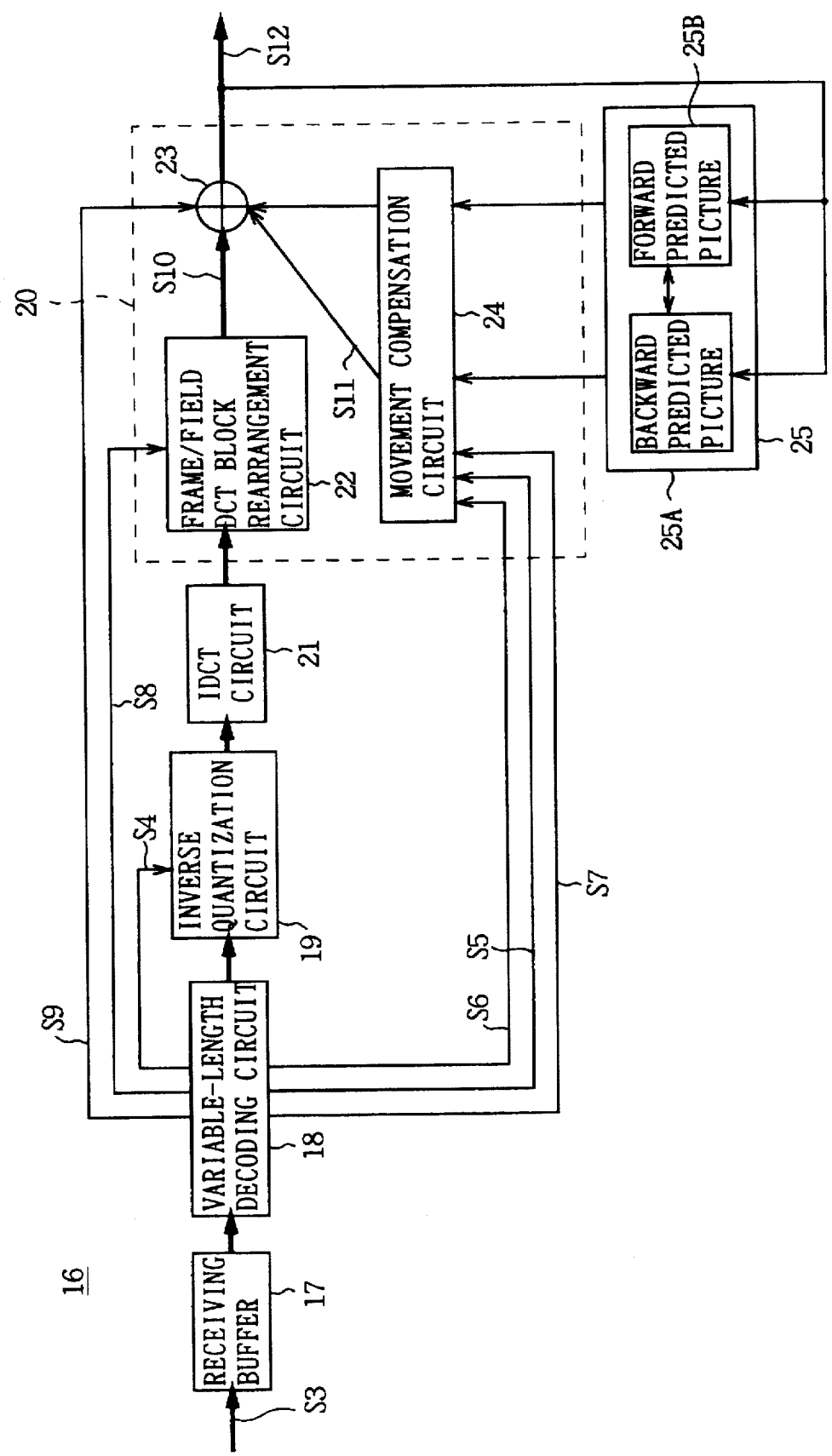
FIG. 6 is a block diagram showing another embodiment of the digital signal decoding apparatus according to the present invention.
Figure 7:
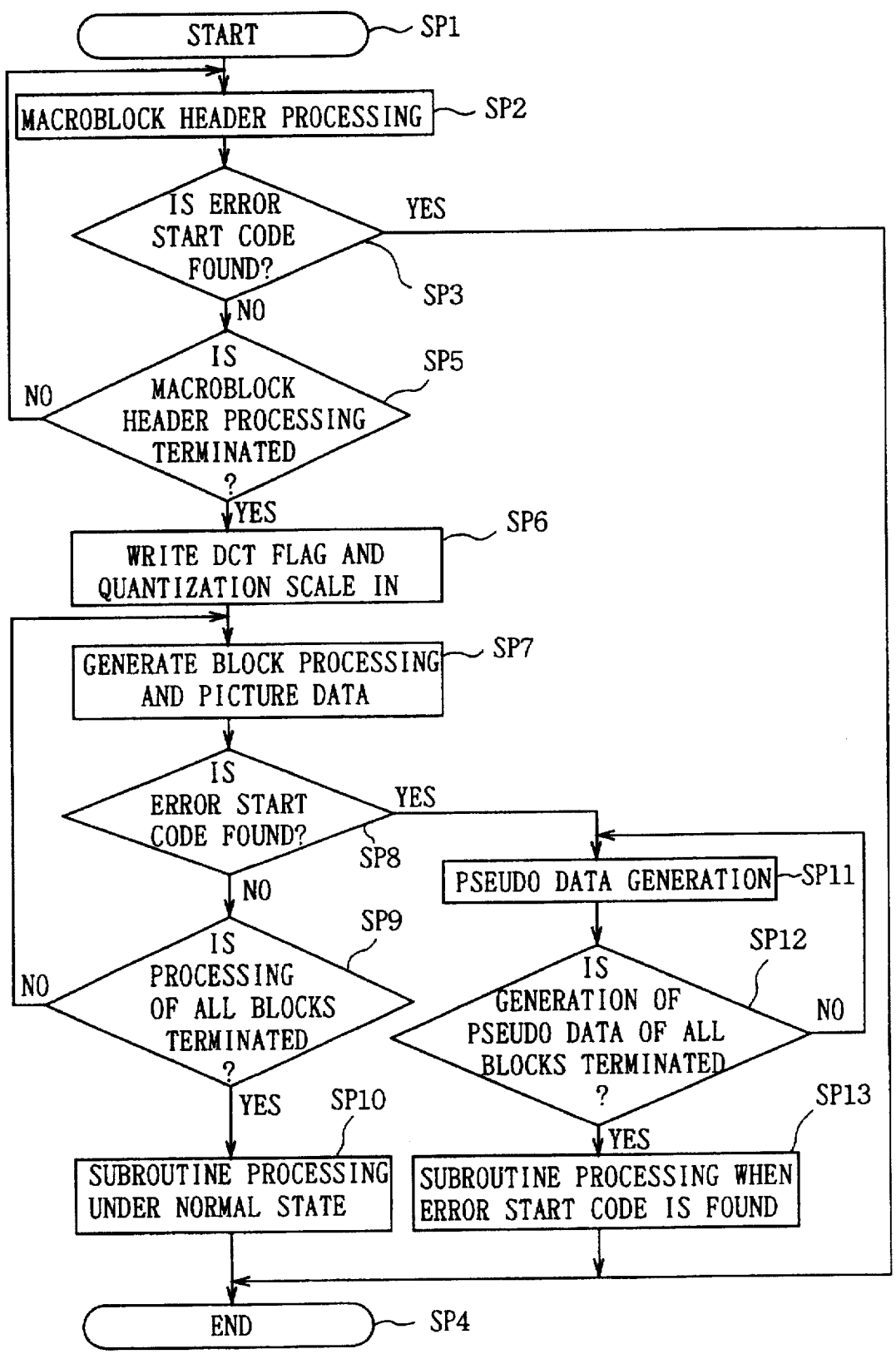
FIG. 7 is a flowchart explaining the processing procedure of a variable-length decoding circuit.

FIG. 6 shows an example of the decoding circuit 16. The decoding circuit 16 captures the bit stream S3 of picture data input through the error detection and correction circuit 14 and the uncorrectable flag conversion circuit 15 in the receiving buffer 17 to temporarily store the bit stream S3.

A variable-length decoding circuit 18 is a main circuit of this embodiment, which obtains quantization step S4, movement vector S5, prediction mode (information regarding the prediction in the macroblock type) S6, frame/field prediction flag S7 (hereafter referred to as prediction flag S7), and frame/field DCT flag S8 (hereafter referred to as DCT flag S8) by variable-length decoding the data group read out from the receiving buffer 17.

The variable-length decoding circuit 18 controls a rear-stage processing circuit by supplying the quantization step S4 among these various types of decoding information to the inverse quantization circuit 19, and supplying the movement vector S5, the prediction mode S6, the prediction flag S7, and the DCT flag S8 to a movement compensation circuit section 20. Moreover, the variable-length decoding circuit 18 supplies a DCT output data mask flag S9 (hereafter referred to as master flag S9) for preventing the corresponding picture data at the time of detection of the error start code $D_{ES}$ to be written on an uncorrectable error part from outputting from the final output stage to the movement compensation circuit section 20.

The inverse quantization circuit 19 inversely quantizes the picture data decoded by the variable-length decoding circuit 18 in accordance with the quantization step S4 supplied from the variable-length decoding circuit 18, and outputs the inversely-quantized data to an IDCT circuit 21. The IDCT circuit 21 performs the inverse DCT processes on the data (DCT coefficient) input from the inverse quantization circuit 19, and supplies the processing result to a frame/field DCT block rearrangement circuit 22 constituting the initial stage of the movement compensation circuit section 20. The frame/field DCT block rearrangement circuit 22 rearranges the data corresponding to a picture format.

A computing unit 23 executes the mask operation of a picture data S10 input through the inverse quantization circuit 19, the IDCT circuit 21, and the DCT block rearrangement circuit 22 to a macroblock to which mask is designated in accordance with the instruction of the mask flag S9. In this case, the mask operation is defined as a processing for not adding the picture data S10 to a predicted picture S11 supplied from a movement compensation circuit 24, or for adding the picture data S10 as zero to the picture S11. According to above mask operation, only a predicted picture is output from the computing unit 23 as an output reproduced picture S12 even if any type of picture data is output from the frame/field DCT block rearrangement circuit 22.

The movement compensation circuit 24 generates the predicted picture S11 corresponding to the frame format of the picture data S10 supplied through the DCT block rearrangement circuit 22 in accordance with a picture read out of a frame memory 25, and supplies the picture S11 to the computing unit 23.

For example, when being I-picture, the picture data S10 is output from the computing unit 23 as the output reproduced picture S12 and stored in a forward predicted picture section 25B of the frame memory 25 in order to generate the predicted picture data of the picture data to be input nextly (the data for P- or B-picture).

When the picture data S10 to be input is the data for P-picture using picture data one frame before the data S10 as predicted picture data and also it is the data for a forward prediction mode, the movement compensation circuit 24 reads out the picture data (the data for I-picture) one frame before from the forward predicted picture section 25B of the frame memory 25.

The movement compensation circuit 24 movement-compensates the picture data read out from the frame memory 25 in accordance with the movement vector S5 supplied from the variable-length decoding circuit 18, and outputs it as the predicted picture data S11.

The computing unit 23 adds the predicted picture data S11 and the picture data (difference data) S10 supplied from the IDCT circuit 21 and outputs the addition output as the output reproduced picture S12.

The addition output, that is, the picture data of decoded P-picture is stored in a backward predicted picture section 25A of the frame memory 25 in order to generate predicted picture data of the picture data (data for B-picture or P-picture) to be next input. In this connection, when the picture data for P-picture is encoded in an inter-picture prediction mode, the computing unit 23 directly outputs the picture data similarly to the picture data of I-picture. Moreover, the picture data is stored in the backward predicted picture section 25B.

In this case, P-picture is not output to a format conversion circuit (not shown) at the rear stage because it is a picture to be displayed next to B-picture.

When B-picture to be next input is encoded in the forward prediction mode, the movement compensation circuit 24 reads out the picture data for I-picture from the forward predicted picture section 25B correspondingly to the prediction mode S6 and movement-compensates the picture data by the movement vector S5 so as to generate the predicted picture S11.

On the other hand, when B-picture is encoded in the backward prediction mode, the movement compensation circuit 24 reads out the picture data for P-picture from the backward predicted picture section 25A correspondingly to the prediction mode S6 and movement-compensates the picture data by the movement vector S5 so as to generate a predicted picture SV.

Moreover, when B-picture is encoded in the bidirectional prediction mode, the movement compensation circuit 24 reads out the picture data for I-picture and P-picture from the forward predicted picture section 25B and the backward predicted picture section 25A correspondingly to the prediction mode S6 and movement-compensates the picture data by the movement vector S5 to generate the predicted picture S11.

Thus, movement-compensated picture data is output from the movement compensation circuit 24 to the computing unit 23 as the predicted picture S11 and added to the output of the IDCT circuit 21.

In this case, however, the addition output which is output from the computing unit 23 is the picture data for B-picture, being not used to generate predicted pictures of other pictures. Therefore, the addition output is not stored in the frame memory 25.

After these pictures for B-picture are output, the movement compensation circuit 24 reads out the picture data for P-picture from the backward predicted picture section 25A and supplies it to the computing unit 23. However, P-picture is not movement-compensated.

In this connection, circuits corresponding to the prediction mode switching circuit on the side of encoding apparatus and DCT mode switching circuit are not shown in the decoding circuit 16. However, the movement compensation circuit 24 executes the processing corresponding to the above circuits, that is, the processing for returning the constitution in which line signals in odd and even fields are separated from each other to the original constitution in which the both line signals are mixed according to necessity.

Though the processing of a luminance signal is described above, the same is also applied to the processing of a color difference signal. In this case, however, a movement vector is used which is obtained by halving a movement vector for a luminance signal vertically and horizontally.

(2-2) Processing for Each Macroblock by Variable-Length Decoding Circuit (2-2-1) Summary of Processing The processings by the variable-length decoding circuit 18 is described below by referring to FIGS. 7 to 10. The variable-length decoding circuit 18 starts decoding from step SP1. At step SP2, the variable-length decoding circuit 18 decodes macroblock headers of bit streams which are successively input.

Then, the variable-length decoding circuit 18 proceeds to step SP3 to determine whether or not the error start code $D_{ES}$ is present at the header part.

If an affirmative result is obtained (that is, when the error start code is present) at step SP3, the variable-length decoding circuit 18 immediately proceeds to step SP4 to terminate the processing of the macroblock.

However, if a negative result is obtained (that is, when the error start code is not found), the variable-length decoding circuit 18 proceeds to step SP5 to determine whether or not the processing of macroblock header is terminated. When a negative result is obtained, the variable-length decoding circuit 18 returns to step SP2 and repeats a series of types of processing.

On the other hand, if an affirmative result is obtained (that is, if the processing of macroblock header is terminated), the variable-length decoding circuit 18 proceeds to step SP6 to obtain the quantization scale S4 and DCT flap S8 and write them in the inverse quantization circuit 19 and the frame/field DCT block rearrangement circuit 22.

Then, as shown in step SP7, the variable-length decoding circuit 18 processes each block following macroblock headers to generate picture data for each block.

Moreover, the variable-length decoding circuit 18 proceeds to step SP8 to determine whether or not the error start code $D_{ES}$ is included.

If a negative result is obtained (that is, if the error start code is not found) at step SP8, the variable-length decoding circuit 18 proceeds to step SP9 to determine whether or not the processing of all blocks is terminated, and repeats a series of processing in step SP7 until the processing of all blocks is determined (that is, until a positive result is obtained).

If an affirmative result is obtained at step SP9, the variable-length decoding circuit 18 proceeds to step SP10 to execute the normal subroutine processing. The detailed processing at step SP10 is described later. When the processing terminates, the variable-length decoding circuit 18 proceeds to step SP4 to terminate the processing of the macroblock.

On the other hand, if an affirmative result is obtained at step SP8 and it is determined that the error start code is included in the macroblock, the variable-length decoding circuit 18 proceeds to step SP11 to generate a pseudo data and controls so that the processing of the macroblock is completed by outputting the pseudo data as a picture data. However, unless the pseudo data is generated at step SP11, the decoding circuit 16 takes a lot of time to control the operation timing of a rear-stage processing circuit which operates in blocks or macroblocks like the inverse quantization circuit 19 and thus, it cannot be avoided that the circuit becomes complicated.

Then, the variable-length decoding circuit 18 proceeds to step SP12 to determine whether or not a pseudo data corresponding to all blocks is generated, and returns to step SP11 to continue generation of the pseudo data until an affirmative result is obtained.

Then, if an affirmative result is obtained at step SP12, the variable-length decoding circuit 18 proceeds to step SP13 to execute the subroutine processing of a macroblock including the error start code. The details of the subroutine processing is also described later. When these processings are terminated, the variable-length decoding circuit 18 proceeds to step SP4 to terminate the processing of the macroblock.

Figure 8:
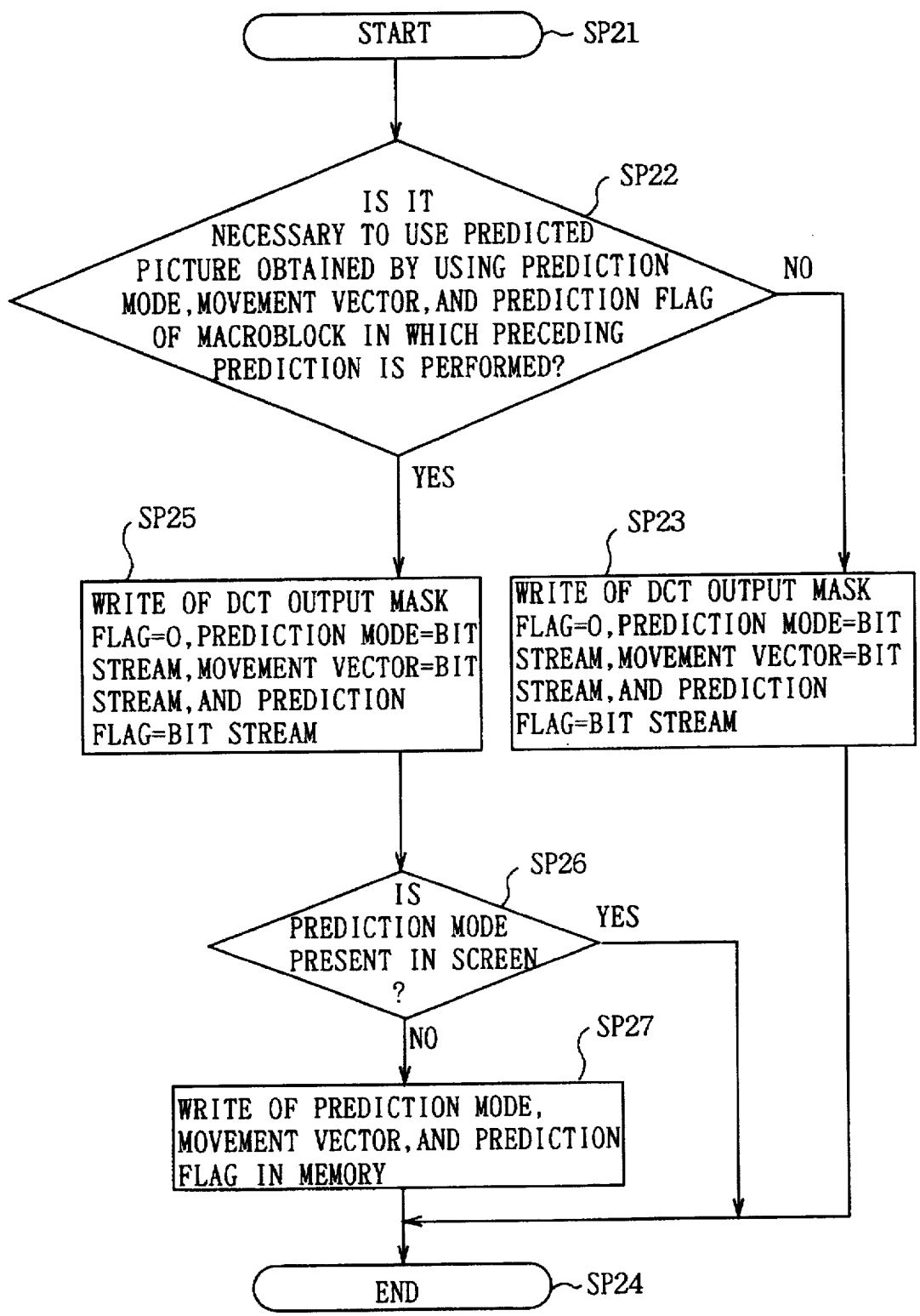
FIG. 8 is a flowchart showing an example of the processing procedure used for normal operation.

(2-2-2) Subroutine Processing Executed by Macroblock Including No Error Start Code Then, detailed processing procedure at step SP10 used for normal operation is described below by referring to FIG. 8.

First, the variable-length decoding circuit 18 starts processing from step SP21. Then, at step SP22, the variable-length decoding circuit 18 determines whether or not to obtain a predicted picture by using the prediction mode S6, the movement vector S5, and the prediction flag S7 of a macroblock located immediately before the macroblock to be processed and being currently predicted.

If a negative result is obtained here, the variable-length decoding circuit 18 proceeds to step SP23 to set the DCT output data mask flag to "0" so as to designate the output of picture data obtained from a bit stream, and writes the data of the bit stream in a rear-stage processing circuit as the prediction mode S6, the movement vector S5, and the prediction flag S7. Then, the variable-length decoding circuit 18 terminates a series of operations at step SP24.

On the other hand, when an affirmative result is obtained at step SP22, the variable-length decoding circuit 18 proceeds to step SP25 to execute the processing same as that at step SP23.

After the processing at step SP25 terminates, the variable-length decoding circuit 18 determines whether or not the prediction mode designated as the processing at step SP26 uses the picture data in the present picture. In an affirmative result is obtained, the variable-length decoding circuit 18 proceeds to step SP24 to terminate the processing. On the other hand, when a negative result is obtained at step SP26, the variable-length decoding circuit 18 writes the prediction mode S6, the movement vector S5, and the prediction flag S7 in a memory.

(2-2-3) Subroutine Processing Executed by Macroblock Including Error Start Code

Figure 9:
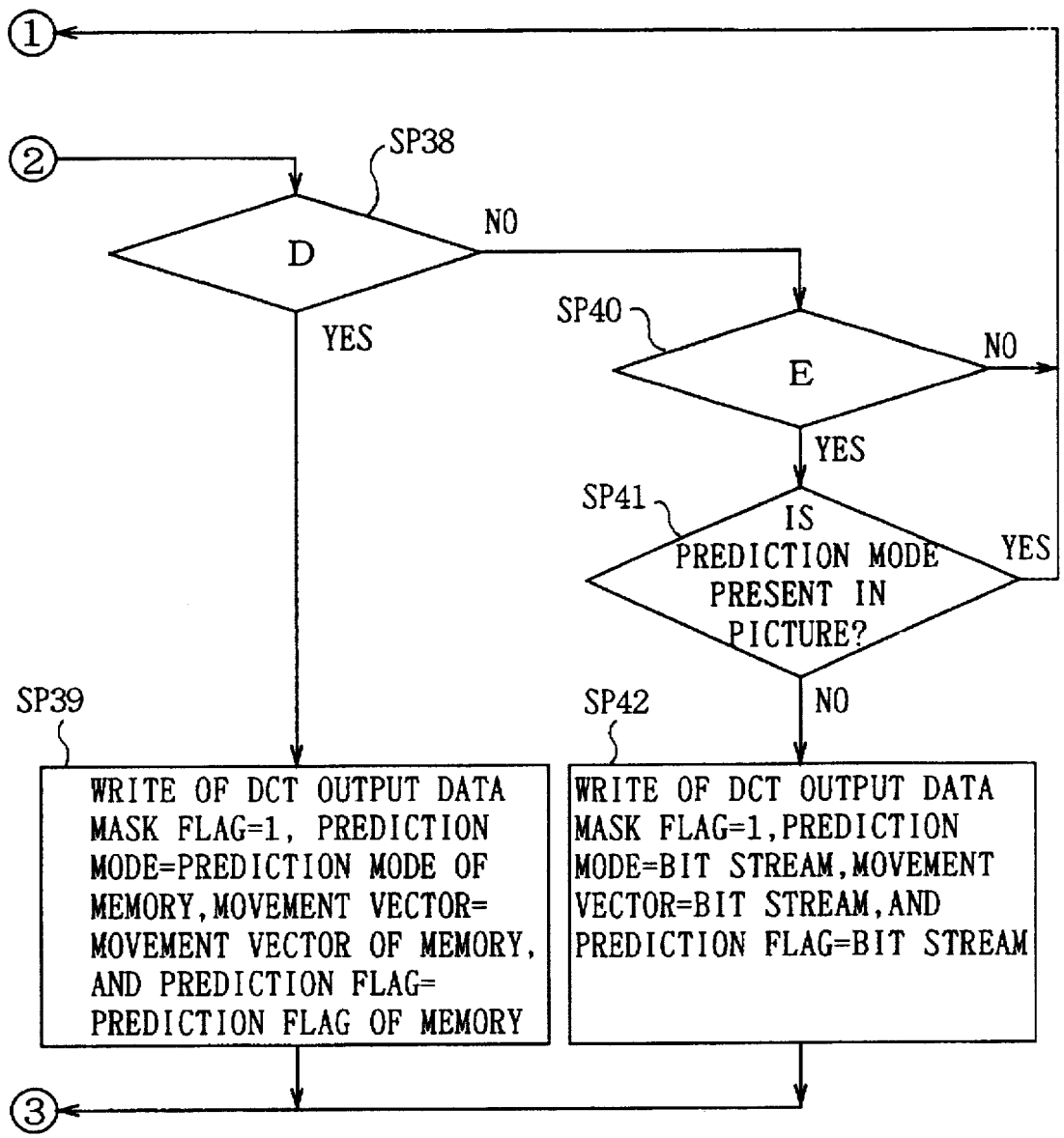
FIG. 9 is a flowchart showing an example of the processing procedure used for special reproduction or data processing including an uncorrectable error.
Figure 10:
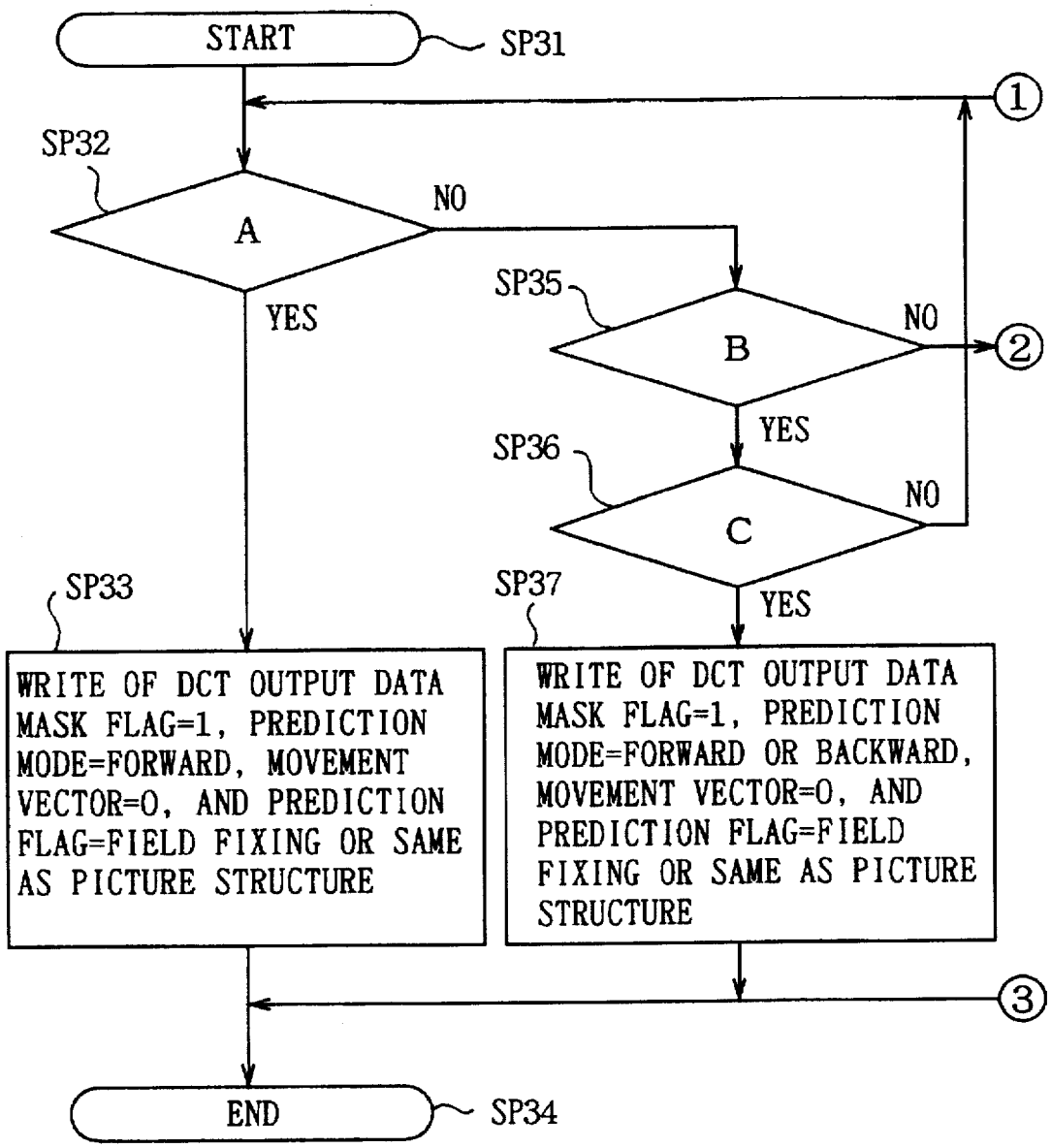
FIG. 10 is a flowchart showing an example of the processing procedure used for special reproduction or data processing including an uncorrectable error.

Then, the processing at the time when a macroblock is broken by the error start code $D_{ES}$ is described below by referring to FIGS. 9 and 10. This processing is the processing to generate a predicted picture output instead of a bit stream picture and the following four methods can be considered as the generation means.

The first method is shown in steps SP32 and SP33, which uses a predicted picture at the spatially same position as a forward picture.

The second method is shown in steps SP35 to SP37, which uses a predicted picture at the spatially same position as a picture one frame before in the display time.

The third method uses a predicted picture obtained by using the prediction mode, movement vector, and prediction flag of a macroblock in which the preceding prediction is performed.

The fourth method is shown in steps SP40 to SP42 and uses a predicted picture obtained by using the prediction mode, movement vector, and prediction flag of a processed macroblock.

The variable-length decoding circuit 18 starts processing from step SP31 in order to generate a predicted picture by any of the these four methods. At step SP32, the variable-length decoding circuit 18 determines whether or not to use a predicted picture at the spatially same position as a forward picture.

If an affirmative result is obtained here, the variable-length decoding circuit 18 proceeds to step SP33 to set the DCT flag S9 to "1" and inhibit a picture from being output from a bit stream composed of the pseudo data and the like. Moreover, the variable-length decoding circuit 18 sets the prediction mode S6 to the forward prediction mode and a movement vector to zero. In this connection, the prediction flag S7 is fixed to a field or set the same as a picture structure is.

When these processing terminate, the variable-length decoding circuit 18 proceeds to step SP34 to terminate the processing.

On the other hand, if a negative result is obtained at step SP32, the variable-length decoding circuit 18 proceeds to step SP35 to determine whether or not to generate a predicted picture by the second method. That is, the variable-length decoding circuit 18 determines whether or not to use a predicted picture at the spatially same position as a picture one frame before in the display time.

If an affirmative result is obtained here, the processing of the variable-length decoding circuit 18 proceeds to step SP36 to determine whether the picture type of the picture to which the macroblock belongs is I-picture, P-picture, or B-picture whose preceding picture is not B-picture. In this case, if a negative result is obtained (that is, the picture preceding the picture to be decoded is B-picture), the variable-length decoding circuit 18 returns to step SP32 so as to retry the determination processing.

On the other hand, if an affirmative result is obtained, the processing of the variable-length decoding circuit 18 proceeds to step SP37 to inhibit the picture data obtained from the bit stream from being output and set the prediction mode S6 to the forward prediction side. Also in this case, the movement vector S5 is set to zero because the picture data at the spatially same position is used. Moreover, the prediction flag S7 is fixed to a field or uses a flag same as a picture structure. After these processings terminate, the processing is terminated at step SP34.

However, when a negative result is obtained at step SP35, the variable-length decoding circuit 18 proceeds to step SP38 to determine whether or not to generate a predicted picture by the third method. That is, the variable-length decoding circuit 18 determines whether or not to use a predicted picture obtained by using the prediction mode, the movement vector, and the prediction flag of a macroblock in which the preceding prediction is performed.

When an affirmative result is obtained here, the variable-length decoding circuit 18 proceeds to step SP39 to set the prediction mode S6, the movement vector S5, and the prediction flag S7 to the prediction mode, the movement vector, and the prediction flag stored in a memory, respectively.

On the other hand, if a negative result is obtained at step SP38, the variable-length decoding circuit 18 proceeds to step SP40 to determine whether or not to generate a predicted picture by the fourth method: that is, the variable-length decoding circuit 18 determines whether or not to use a predicted picture obtained by using the prediction mode, the movement vector, and the prediction flag of a processed macroblock.

If an affirmative result is obtained at step SP40, the variable-length decoding circuit 18 proceeds to step SP41 to determine whether or not the prediction mode is in a picture. If a negative result is obtained at step SP41, the variable-length decoding circuit 18 proceeds to step SP42 to set the prediction mode S6, the movement vector S5, and the prediction flag S7 read out of the header of the processed macroblock.

When a series of these processings terminates, the variable-length decoding circuit 18 proceeds to step SP34 to terminate the processing of the present macroblock.

(2-3) Decoding Example

In this section, a specific example of processing of the decoding circuit 16 is described in detail by referring to FIGS. 11A to 11H. In this case, it is assumed that the macroblock "2" is interrupted by an error start code as shown in FIGS. 11A and a bit stream in which data of the macroblock is uncompleted is input to the variable-length decoding circuit 18.

In this case, it is assumed that the macroblock "1" includes the whole data from the block "1-1" to the block "1-6" and the macroblock data is completed. On the other hand, in the case of the macroblock "2", the block "2-2" is not completed and interrupted by the error start code $D_{ES}$.

First, the variable-length decoding circuit 18 inputs the macroblock "1" in which a bit stream is present to the end. In this case, processing the macroblock header of the macroblock "1" enables the variable-length decoding circuit 18 to supply the DCT flag S8, the quantization scale S4, the prediction mode S6, the movement vector S5, and the prediction flag S7 to a rear-stage circuit, and moreover to supply the picture data to the inverse quantization circuit 19 whenever processing each block.

Actually, however, the variable-length decoding circuit 18 cannot detect that a bit stream is present to the end for the macroblock "1" until the processing of all blocks is terminated by processing the blocks "1-1" to "1-6" in order after the processing of the macroblock header "1" terminates. Therefore, it is not determined whether or not the data of the macroblock "1" can be supplied to a rear-stage circuit until the processing of all blocks of the macroblock "1" terminates, so that the variable-length decoding circuit 18 outputs various flags and data at the following timing.

First, as shown in FIG. 11C, the variable-length decoding circuit 18 writes the quantization scale S4 and the DCT flag S8 among the DCT flag S8, the quantization scale S4, the prediction mode S6, the movement vector S5, and the prediction flag S7 in the inverse quantization circuit 19 and the frame/field DCT block rearrangement circuit 22 when the processing of the macroblock header terminates.

Then, the variable-length decoding circuit 18 start processing in each block to obtain the decoded picture of each block.

In this case, because a memory circuit for a macroblock is not prepared at the rear stage of the variable-length decoding circuit 18, the decoded picture data is directly supplied to the inverse quantization circuit 19. However, because the inverse quantization circuit 19 and the IDCT circuit 21 at the rear stage operate assuming one block (8 pixels×8 lines) as the unit, it is also possible to supply the picture data processed by the variable-length decoding circuit 18 to the inverse quantization circuit 19 through a memory circuit for a block.

The inverse quantization circuit 19, the IDCT circuit 21, the frame/field DCT block rearrangement circuit 22 execute each processing whenever the picture data of each block is supplied as shown in FIG. 11D.

When the all processing of the macroblock "1" terminates, the variable-length decoding circuit 18 outputs the prediction mode S6, the movement vector S5, the prediction flag S7, and the mask flag S9, all of which are obtained by the macroblock header, to the movement compensation circuit section 20.

In this case, because the processing by the variable-length decoding circuit 18 is completed for the macroblock "1", the prediction mode S6, the movement vector S5, and the prediction flag S7 are output having the contents of the macroblock header "1" as it is.

In this connection, because the macroblock "1" is a completed macroblock, the mask flag S9 output from the variable-length decoding circuit 18 is designated to "0" (that is, no mask). The mask flag S9 is generated at the timing shown in FIG. 11E. The above-mentioned processes are the processings at steps SP1 to SP10.

The movement compensation circuit section 20 executes decoding in accordance with these flags.

The computing unit 23 receives the picture data through the inverse quantization circuit 19, the IDCT circuit 21, and the frame/field DCT block rearrangement circuit 22 at the timing shown in FIG. 11F. In this case, the time difference present between the input of the flags and the input of data to the computing unit 23 is a delay time required for the processing by the movement compensation circuit 24.

Then, the computing unit 23 adds the picture data S10 obtained from a bit stream and the predicted picture S11 read out of the movement compensation circuit 24 at the timing shown in FIGS. 11F and 11G and outputs the addition result as the output reproduced picture S12. In this case, because the designation of the mask flag S9 shows "absence of mask", both picture data S10 and S11 are added to the macroblock "1".

Then, the processing for the macroblock "2" including the error start code is described below.

The variable-length decoding circuit 18 detects an abnormal delimitation produced in a bit stream by the error start code $D_{ES}$ including a synchronous code. In FIGS. 11B and 11C, a case is described in which the error start code $D_{ES}$ is found in the middle of the processing of the block "2-2".

The variable-length decoding circuit 18 processes the macroblock header "2" and block "2-1" similarly to the case of the macroblock "1". The block "2-1" is not a pseudo data.

The variable-length decoding circuit 18 supplies the quantization scale S4 and the DCT flag S8 to a rear-stage circuit at the timing shown in FIG. 11C when the processing of the macroblock header "2" terminates similarly to the case of the macroblock "1". Then, the variable-length decoding circuit 18 processes the block "2-1" and supplies the picture data for the block "2-1" to the inverse quantization circuit 19.

The variable-length decoding circuit 18 finds the error start code while processing the block "2-2". At this time, the variable-length decoding circuit 18 generates a pseudo data for the remaining part of the macroblock "2" where a bit stream is broken so as to complete the macroblock "2" taking into consideration that the inverse quantization circuit 19 and the IDCT circuit 21 perform processing in blocks and the movement compensation circuit 24 performs processing in macroblocks. This state is shown in FIG. 11B.

In this case, the pseudo data composed of a value such as zero is output to the inverse quantization circuit 19 as the remaining picture data of the block "2-2" in which the error start code is found and the picture data of remaining blocks "2-3", "2-4", "2-5", and "2-6". In this connection, because the picture data of the macroblock "2" is designated by the mask flag S9 so that it is not used for operation in the computing unit 23, it is possible to use any value except zero as the value of the pseudo data.

The inverse quantization circuit 19, the IDCT circuit 21, and the frame/field DCT block rearrangement circuit 22 execute each processing in accordance with the picture data composed of the pseudo data, and supplies the processing results to the computing unit 23.

The prediction mode S6, the movement vector S5, the prediction flag S7, and the mask flag S9 used in the movement compensation circuit 24 are output at the time when the whole processing of the macroblock "2" completes. In this case, the whole processing is defined as generation of pseudo data up to the block "2-6".

As described above, because the macroblock "2" is interrupted by the error start code $D_{ES}$ and thereby, unusual picture data is processed, the control is made so that the unusual picture data does not affect reproduction due to copying of a predicted picture. Copying of the predicted picture is a processing performed by means of the prediction mode S6, the movement vector S5, the prediction flag S7, and the mask flag S8, and moreover using the movement compensation circuit 24 and the computing unit 23.

The predicted picture S11 thus generated includes the predicted picture at the spatially same position as the forward picture as described in the previous section (steps SP32 to SP33), the predicted picture at the spatially same position as one frame before in the display time (steps SP35 to SP37), the predicted picture immediately before a macroblock interrupted by the error start code $D_{ES}$ and obtained by means of the prediction mode S6, the movement vector S5, and the prediction flag S7 of a macroblock being predicted (steps SP38 to SP39), and the predicted picture obtained by using the prediction mode S6, the movement vector S5, and the prediction flag S7 designated by a processed macroblock header (steps SP40 to SP42).

The variable-length decoding circuit 18 obtains the prediction mode S6, the movement vector S5, and the prediction flag S7 for obtaining these predicted pictures SV, and outputs them to the movement detection circuit 24. Moreover, in this case, the designation of the mask flag S9 shows "presence of mask" (that is, "1").

In this connection, when the macroblock "2" is composed of only the data in the present picture without using prediction, the procedure is changed so as to generate a predicted picture by means of the prediction mode S6, the movement vector S5, and the prediction flag S7 of adjacent macroblock.

The movement compensation circuit 24 generates a predicted picture according to the flags as shown in FIG. 11G. Moreover, the computing unit 23 adds and outputs the pseudo picture data S10 input through the inverse quantization circuit 19 or the like and the predicted picture S11 input from the movement compensation circuit 24. However, because "presence of mask" is designated by the mask flag S9, the picture data S10 is not used for calculation but the predicted picture S11 is directly output and serves as the output reproduced picture S12.

According to the above constitution, it is possible to realize a picture data decoding apparatus capable of operating an uncompleted macroblock delimited by the error start code $D_{ES}$ without damaging the operations of the internal circuits of the decoding circuit 16 which operate in blocks or macroblocks. Moreover, this embodiment does not require any special timing control circuit for correctly operating the internal circuits. Therefore, it is not necessary to care about increase of the circuit scale.

Moreover, because a reproduced picture is not affected by substituting a predicted picture for the picture data part of an uncompleted macroblock to output the macroblock, it is possible to realize a picture data decoding apparatus making it possible to obtain a picture superior in quality compared to a conventional one.

(3) Other Embodiments

In the above embodiment, the error start code $D_{ES}$ uses a 32-bit code expressed by "00000000 00000000 00000000

00000001 10110100". However, the present invention is not only limited to this, but any code including a synchronous code can be used. Moreover, the code length is not only limited to 32 bits, but a code with a length of more than 32 bits can be used.

Moreover, in the above embodiment, the operation of the decoding circuit 16 is avoided from damaging by inserting the error start code $D_{ES}$ into a bit stream. However, the present invention is not only limited to this, but the error start code $D_{ES}$ can be used for other processing such as the special reproduction.

Furthermore, in the above embodiment, discrete-cosine-transformed data is decoded at the time of encoding. However, the present invention is not only limited to this, but also can widely be applied to decode orthogonally transformed data.

Furthermore, in the above embodiment, a video signal input through a recording medium 3 or transmission line is decoded. However, the present invention is not only limited to this, but also can be applied to decode an aural signal or a control signal in addition to the video signal.

As described above, according to the present invention, an uncorrectable error part of a digital signal or a data part including the uncorrectable error part is replaced with a special code including a synchronous code, and is output to the decoding means, so that it is possible to obtain a digital signal decoding apparatus which can confirm the presence of an error at the time of decoding and execute proper error processing.

Moreover, according to the present invention, when a predetermined-length data group constituting a digital signal is delimited by a predetermined code and uncompleted, the decoding means outputs a predicted digital signal instead of a decoded signal of the uncompleted data group. Therefore, it is possible to obtain a digital signal decoding apparatus which can obtain an output signal not affected by the data group without adding a special circuit for processing the data group.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A digital signal decoding apparatus for inputting a digital signal through a transmission path to generate an output signal by means of a decoded signal of said digital signal and a predicted digital signal, comprising decoding processing means for outputting said predicted digital signal instead of the decoded signal of a predetermined-length data group constituting said digital signal when said data group is delimited by a predetermined code and it is uncompleted.

2. The digital signal decoding apparatus according to claim 1, wherein said decoding processing means has a variable-length decoding circuit, and said variable-length decoding circuit transmits various flag signals used to generate said predicted digital signal to a rear-stage circuit when all processings for said predetermined-length data group are completed.

3. The digital signal decoding apparatus according to claim 2, wherein an output inhibiting flag for inhibiting the use of the decoded signal of said digital signal is included in said various flag signals.

4. The digital signal decoding apparatus according to claim 3, wherein said variable-length decoding circuit inserts a pseudo data into a deficient part of said uncompleted data group so that the processing in the rear-stage circuit is completed when said uncompleted data group is inputted.

5. The digital signal decoding apparatus according to claim 3, wherein the circuit located at the rear stage of said variable-length decoding circuit has a computing circuit for calculating a decoded signal of said digital signal and said predicted digital signal so as to generate an output signal, and said computing circuit regards the value of said decoded signal corresponding to the predetermined-length data group as zero when the use of said decoded signal is inhibited by said output inhibiting flag.

6. The digital signal decoding apparatus according to claim 3, wherein the circuit located at the rear stage of said variable-length decoding circuit has a computing circuit for calculating a decoded signal of said digital signal and said predicted digital signal so as to generate an output signal, and said computing circuit does not use said decoded signal corresponding to the predetermined-length data group for operation when the use of said decoded signal is inhibited by said output inhibiting flag.

7. The digital signal decoding apparatus according to claim 1, wherein:

said digital signal is a video signal; and said predicted digital signal is a picture at the spatially same position as a forward picture.

8. The digital signal decoding apparatus according to claim 1, wherein:

said digital signal is a video signal; and said predicted digital signal is a picture at the spatially same position as a predicted picture one frame before in the display time.

9. The digital signal decoding apparatus according to claim 1, wherein:

said digital signal is a video signal; and said predicted digital signal is a picture immediately before said uncompleted data group delimited by said predetermined code, and is obtained by means of various flag signals of a predicted data group.

10. The digital signal decoding apparatus according to claim 1, wherein:

said digital signal is a video signal; and said predicted digital signal is a picture obtained by means of various flag signals designated by a header when the process of said header part of said data group is finished.

11. The digital signal decoding apparatus according to claim 1, wherein said predetermined code is an error start code.

12. A digital signal decoding apparatus, comprising:

error detecting and correcting means for inputting a digital signal through a transmission path, for correcting and outputting an error part included in said digital signal, and for indicating the position of an uncorrectable error part by a flag signal;

data replacing means for replacing a digital signal part having the same data length as a special code including a synchronous code which is said uncorrectable error part indicated by said flag signal or a data part including said uncorrectable error part with said special code, and for outputting the special code when said uncorrectable error part is included in said digital signal output from said error detecting and correcting means; and decoding means for inputting said digital signal output from said data replacing means, and for decoding said digital signal by means of said special code.

13. The digital signal decoding apparatus according to claim 12, wherein said data replacing means is provided just before a receiving buffer for storing said digital signal.

14. The digital signal decoding apparatus according to claim 12, wherein said data replacing means provides;

a code generating section for generating said special code at said uncorrectable error part based on said flag signal and a replacing section for detecting the input of said special code, and for replacing said digital signal having a predetermined data length corresponding to the position where said special code is detected among a plurality of digital signals with said special code.

15. The digital signal decoding apparatus according to claim 12, wherein said special code is an error start code.

* * * * *